United States Patent [19]

Wada et al.

[11] Patent Number: 4,495,610
[45] Date of Patent: Jan. 22, 1985

[54] CIRCUIT ARRANGEMENT FOR APPLYING HIGH FREQUENCY ENERGY TO A CAPACITANCE DETECTION RECORD STYLUS

[75] Inventors: Yoshiyo Wada, Yokohama; Hideaki Takehara, Fujisawa, both of Japan

[73] Assignee: Victor Company of Japan, Limited, Japan

[21] Appl. No.: 416,715

[22] Filed: Sep. 9, 1982

[30] Foreign Application Priority Data

Sep. 12, 1981 [JP] Japan .................................. 56-144332

[51] Int. Cl.³ .......................... G11B 9/06; G11B 17/00
[52] U.S. Cl. .................................................... 369/126
[58] Field of Search ............... 369/126, 100, 111, 221; 358/342

[56] References Cited

U.S. PATENT DOCUMENTS 3,870,320 3/1975 Torrington .......................... 369/221
4,017,678 4/1977 Baker .................................. 358/342
4,086,617 4/1978 Baker .................................. 369/126

Primary Examiner—Donald E. McElheny, Jr.
Attorney, Agent, or Firm—Lowe, King, Price & Becker

[57] ABSTRACT

A circuit arrangement comprises a first delay circuit which is responsive to the leading edge of a command signal to generate a first signal a delay time after the occurrence of the leading edge and a second delay circuit which is responsive to the trailing edge of the command signal to generate a second signal a delay time after the occurrence of the trailing edge. A stylus control solenoid responds to the leading edge of the command signal for lowering the stylus into slidable contact with the surface of a capacitance disc record and further responds to the second signal for lifting the stylus from the record. A high frequency source is arranged to respond to the first signal by generating high frequency energy for application to the electrode of a capacitance detection stylus and further responds to the trailing edge of the command signal.

5 Claims, 7 Drawing Figures

CIRCUIT ARRANGEMENT FOR APPLYING HIGH FREQUENCY ENERGY TO A CAPACITANCE DETECTION RECORD STYLUS

BACKGROUND OF THE INVENTION

The present invention relates to the reproduction of capacitance disc records, and in particular to a circuit arrangement for applying high frequency energy to the electrode of a capacitance detection stylus.

It is known in the art that capacitance disc records comprise a resin formed of a copolymer of vinyl chloride and vinyl acetate by a compression molding to copy the microscopic pits formed on the surface of a stamper. The copied surface of the resin material is coated with a conductive layer which serves an electrode. On the conductive layer is an overlying layer of a dielectric material having a thickness of a few hundreds Angstrom units. A system of variable capacitance is formed by the conductive and dielectric layers and the electrode provided on a record stylus. The conductive layer may also be provided by mixing carbon particles with the copolymer prior to the molding process. The record stylus is typically constructed of a diamond on the rear face of which is provided the stylus electrode to which high frequency energy is applied for detecting the geometric variation as capacitance variation.

The dielectric layer is formed of a material both resistant to wear which might be caused by contact with the stylus and to a concentration of the high frequency energy. However, upon contact with the record surface, the stylus would exert a pressure of as high as several tens of ton per square centimeter if the tip of the stylus is inclined to the surface plane of the record with the attendant concentration of high frequency energy at the contact point of the stylus electrode. As a result, the surface of the dielectric layer may be severely damaged to such an extent that the underlyng conductive layer is revealed. In such instances, a short circuit path is established between the conductive layer of the disc and the stylus electrode producing a heavy current which results in impairment of the stylus tip and the disc surface which in turn results in the generation of errors in the output signal. Such impairments also occur at the instant the stylus is raised from the record surface. Since the impairment of the disc is likely to result in a dropout, the error of this type can be eliminated electronically by dropout compensation technique. However, the impairment of the stylus results in a poor carrier-to-noise ratio which cannot be compensated.

SUMMARY OF THE INVENTION

The present invention eliminates the problems mentioned above by engaging the record stylus into contact with the disc record in the absence of a high frequency field, disengaging the stylus from contact with the record in the absence of the field and generating the high frequency field in the dielectric layer during a period commencing after the engagement of the stylus and terminating before the disengagement of the stylus.

The invention provides a circuit arrangement for applying high frequency energy in response to a command signal to the electrode of a capacitance detection stylus adapted for engaging slidably with a capacitance disc record on which information is recorded as a geometric variation. The circuit arrangement comprises first delay means responsive the leading edge transition of the command signal for generating a first signal a delay time after the the occurrence of said leading edge transition, and second delay means responsive to the trailing edge transition of the command signal for generating a second signal a delay time after the occurrence of said trailing edge transition. The circuit further includes stylus moving means which is responsive to the leading edge transition of the command signal for moving the stylus into slidable engagement with the surface of the disc and responsive to the second signal for moving the stylus away from the record. High frequency generating means is provided to respond to the first signal by generating high frequency energy for application to the electrode of the stylus and further respond to the trailing edge transition of the command signal by terminating the high frequency energy.

BRIEF DESCRIPTION OF THE DRAWINGS

The present invention will be described in further detail with reference to the accompanying drawings, in which.

DETAILED DESCRIPTION

Figure 1:
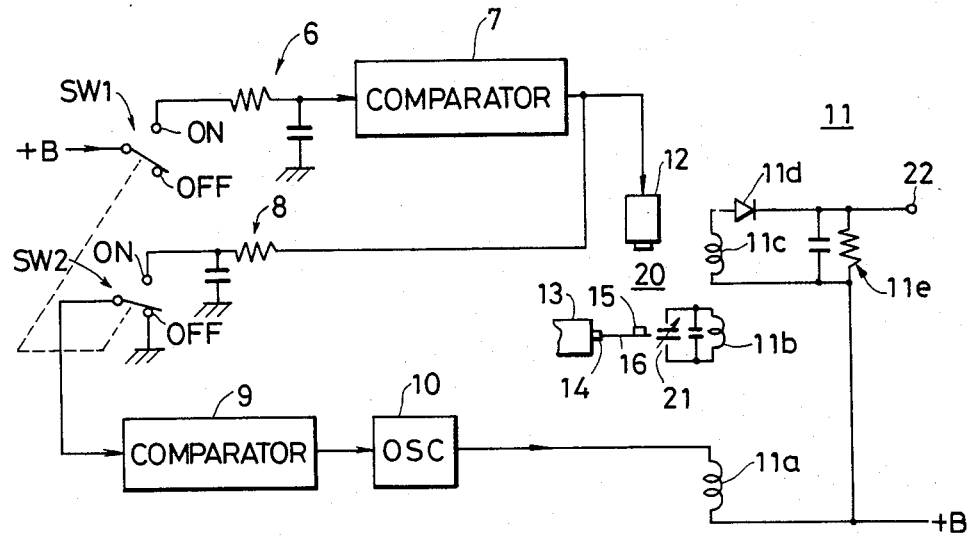
FIG. 1 is a block diagram of a first embodiment of the invention.

Referring now to FIG. 1, there is shown a preferred embodiment of the circuit arrangement of the invention for application of high-frequency energy to the stylus of a capacitance disc playback system. The circuit comprises a pair of ganged switches SW1 and SW2, a first time-constant delay circuit 6, a first comparator 7, a second time-constant delay circuit 8, a second comparator 9 and a 1-GHz oscillator 10, all of which are connected in series from a DC voltage source +B and a capacitance detection circuit 11. The second switch SW2 has an OFF position contact which is grounded to connect a ground potential to the input of the second comparator 9 when the switch SW2 is turned off. Switches SW1 and SW2 are arranged to respond to the leading edge of a PLAY command signal applied thereto from a control source, not shown, to transfer their moving contacts to ON positions and respond to the trailing edge of the command signal to return the moving contacts to OFF positions.

Connected to the output of the comparator 7 is a stylus control solenoid assembly 12 which is located above the stylus assembly 20. As shown clearly in FIG. 2, the stylus assembly 20 comprises a stylus support arm, or cantilever 15 secured by a damper 14 to a support 13 which is mounted on a drive system of known construction. The cantilever 16 is attached with a capacitance detection stylus S at the free end thereof and a permanent magnet 15 which is located in a position intermediate the opposite ends thereof directly below the stylus control solenoid assembly 12. The assembly 12 is arranged so that when energized it produces a repulsive force against the permanent magnet 15 to lower the stylus S to the surface of the record. As is known in the art, the stylus S is formed of a diamond and an electrode attached to the rear face of the diamond. In the lower position, the stylus electrode is aligned with the information track to detect geometric variation on the track as a capacitance variation.

Figure 2:
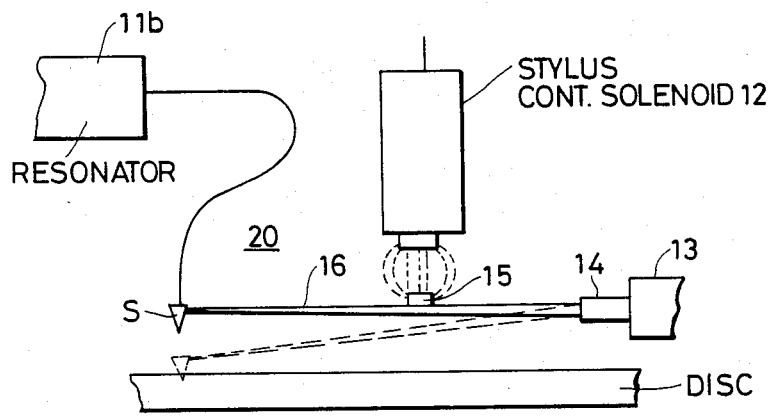
FIG. 2 is an illustration of the stylus assembly located with respect to the stylus control solenoid.

The capacitance detection circuit 11 comprises a semi-coaxial resonator 11a connected to the 1-GHz oscillator 10 for coupling the 1-GHz energy to a second semi-coaxial resonator 11b. As shown in FIG. 2, the resonator 11b is connected to the electrode of the stylus S to generate a high frequency field between the stylus electrode and the electrode of a capacitance disc record which may be formed by a thin conductive layer underlying the upper dielectric layer or by conductive particles embedded in the record disc. Signals are recorded in the form of a series of microscopic pits in the dielectric layer to create variations in capacitance value between such electrodes.

The second semi-coaxial resonator 11b is connected to the stylus electrode to couple the high frequency energy from the first semi-coaxial resonator 11a to detect the geometric variations in the dielectric layer of the disc record as a capacitance variation. This variable capacitance, as schematically indicated at 21 in FIG. 1, is coupled in parallel with the resonator 11b, so that it produces a current variation which is in turn detected by a a detector circuit formed by a semi-coaxial resonator 11c, a diode 11d and a low-pass filter 11e from which an output signal is delivered to a terminal 22.

Figure 3:
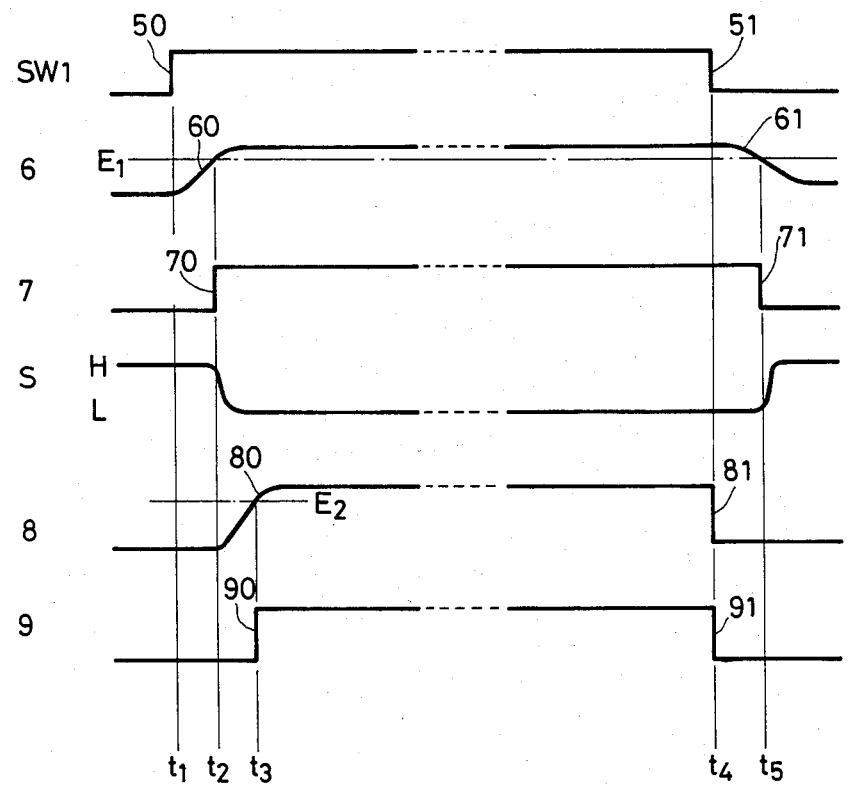
FIG. 3 is an illustration of a timing diagram associated with the first embodiment.

The switches SW1 and SW2 are in their OFF position when the system is not in operation and are switched to their "on" position when the system is in operation. The operation of the control circuit will be described with reference to FIG. 3.

When the switches SW1 and SW2 are transferred to their "on" position at time $t_1$, the DC voltage B+ is applied to the time-constant delay circuit 6 so that the voltage at the input of delay circuit 6 is raised as shown at 50 and its output voltage gradually raises as shown at 60. This output voltage is compared in the comparator 7 with a reference voltage $E_1$. When the latter is exceeded, the comparator 7 switches to a high output state as shown at 70, the output of comparator 7 being applied to the stylus control assembly 12 so that the stylus S is lowered from an upper position H to a lower position L at time $t_2$. The output of the comparator 7 is also applied to the second delay circuit 8. The delay circuit 8 produces an output voltage which rises as indicated at 80 and crosses a reference voltage $E_2$ at time $t_3$. The second comparator 9 compares the voltage developed in the time constant delay circuit 8 with the reference $E_2$ and switches to a high voltage level as shown at 90 when the reference $E_2$ is exceeded to enable the 1-GHz oscillator 10 to generate a high frequency output. This high frequency signal is applied to the electrode of the stylus S which has been placed in contact with the record surface. Thus, even if the stylus lands on the record surface at an acute angle thereto the dielectric surface layer of the record is free from the high frequency energy concentration which would occur otherwise.

When the switches SW1 and SW2 are turned off at time $t_4$ after the operation of the system, the input of the second comparator 9 decays as shown at 81 to a zero potential so that comparator 9 switches to low voltage level as shown at 91. On the other hand, the turn-off of switch SW1 causes the input voltage to the delay circuit 6 to go low as shown at 51 and as a result the output of delay circuit 6 decays as shown at 61 to cross the reference voltage $E_1$ at time $t_5$. Thus, the output of the comparator 7 switches to a low level as shown at 71, resulting in the stylus S to move upward. Therefore, the stylus S is lifted from the record surface in the absense of the high frequency potential and hence no high frequency concentration occurs.

Figure 4:
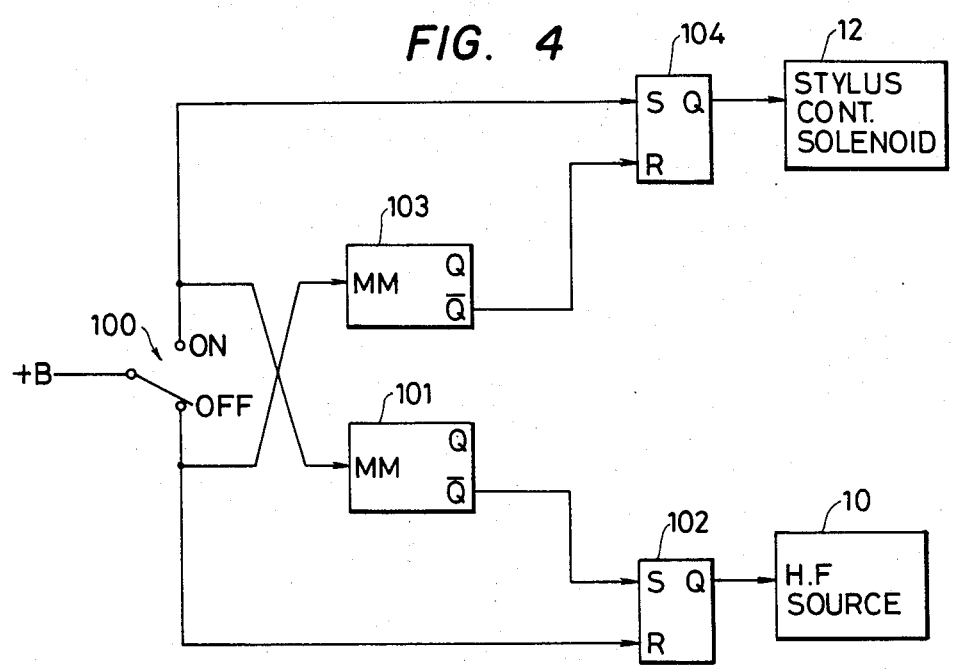
FIG. 4 is a block diagram of a second embodiment of the invention.

FIG. 4 is an illustration of a second embodiment of the invention. The circuit comprises a switch 100 having an ON contact position coupled to a monostable multivibrator 101 having a complementary output coupled to the set input of a flip-flop 102. The ON contact position of switch 100 is further connected to the set input of a flip-flop 104 having a reset input coupled to the complementary output of a monostable multivibrator 103 the input of which is connected the Off contact position of switch 100. The OFF contact position of switch 100 is further connected to the reset input of the flip-flop 102. The Q outputs of the flip-flops 102 and 104 are connected respectively to the high frequency source 10 and the stylus control solenoid 12. The switch 100 is responsive to the leading edge of a command signal applied thereto to transfer its moving contact to the ON position and responsive to the trailing edge of the command signal to return the moving contact to the OFF position.

Figure 5:
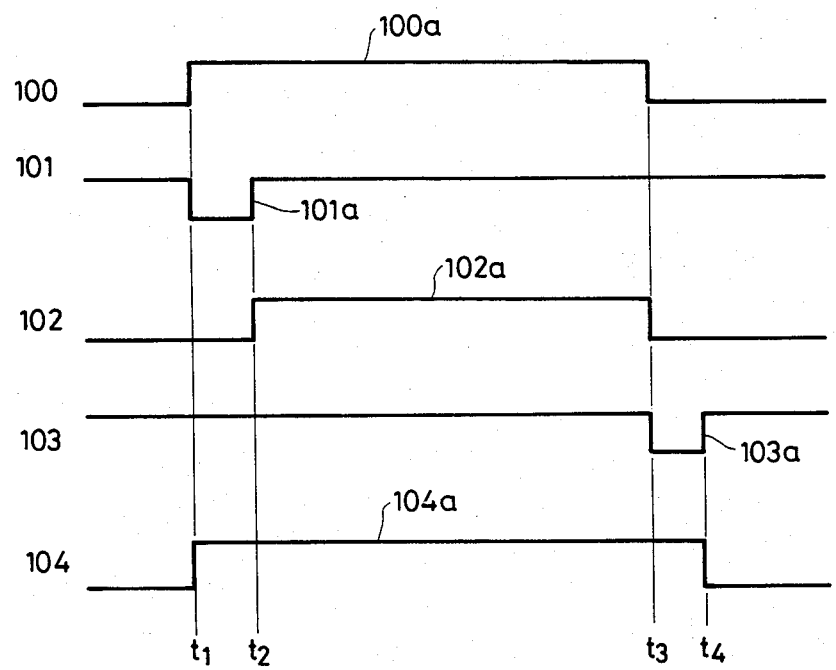
FIG. 5 is a timing diagram associated with the second embodiment.

The operation of the circuit of FIG. 4 will be visualized with reference to FIG. 5. In response to the switch 100 being transferred to the ON contact position as shown at 100a at time $t_1$, the flip-flop 104 is triggered into a set condition generating an output 104a to energize the solenoid 12, so that the stylus S is brought into slidable contact with the record. Simultaneously, the monostable multivibrator 101 is triggered to generate a negative-going pulse 101a of an appropriate duration. The flip-flop 102 is triggered into a set condition as shown at 103a at time $t_2$ to cause the high frequency source 10 to generate 1-GHz energy.

When the switch 100 is transferred to the OFF contact position at time $t_3$, the flip-flop 102 is reset to de-energize the high frequency source 10 and at the same time the monostable multivibrator 103 is triggered to generate a negative-going pulse 103a of an appropriate duration. The flip-flop 104 is reset in response to the pulse 103a to raise the stylus to initial position.

Figure 6:
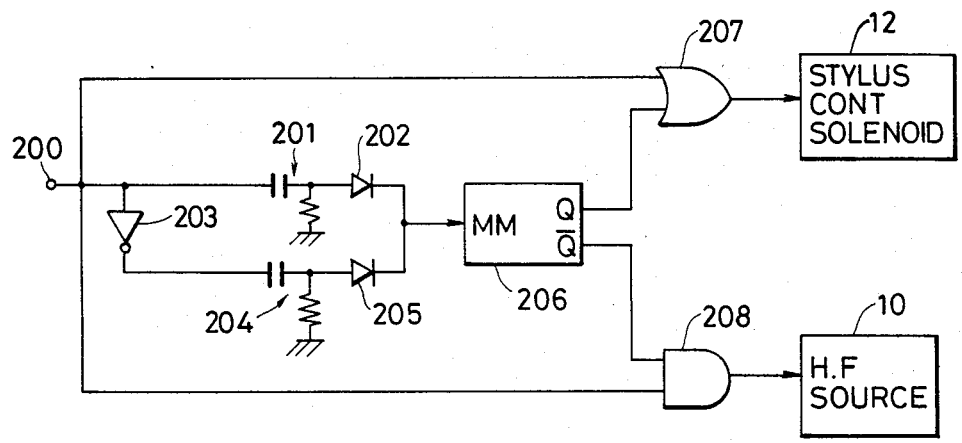
FIG. 6 is a block diagram of a third embodiment of the invention.
Figure 7:
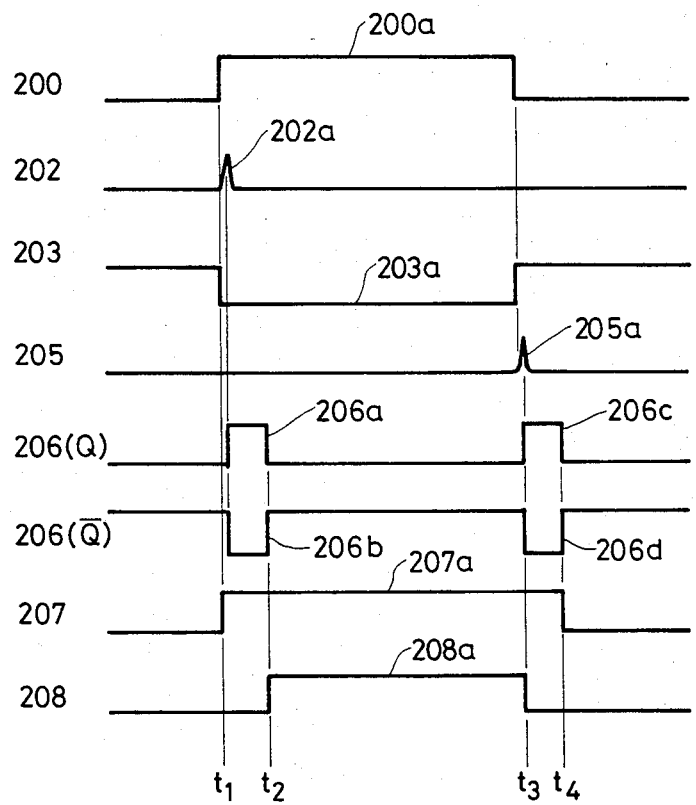
FIG. 7 is an illustration of a timing diagram associated with the third embodiment.

A third embodiment of the invention is illustrated in FIG. 6. This embodiment comprises a leading edge detector formed by a differentiator 201 and a diode 202 for detecting the leading edge transition of the command signal which is applied to an input terminal 200 and a trailing edge detector formed by an inverter 203, a differentiator 204 and a diode 205 for detecting the trailing edge transition of the command signal. The outputs of the edge detectors are connected together to a monostable multivibrator 206 having true and complementary outputs coupled respectively to an OR gate 207 and an AND gate 208 whose outputs are connected to the stylus control solenoid 12 and high frequency source 10, respectively. The input terminal 200 is also connected to the OR gate 207 and AND gate 208. The operation of the circuit of FIG. 6 will be described with reference to FIG. 7.

In response to the leading edge of a command signal 200a at time $t_1$, the output of OR gate 207 goes high as shown at 207a to energize the solenoid 12 and a pulse 202a is generated at the output of diode 202 which triggers the multivibrator 206. Pulses 206a and 206b are generated respectively at the true and complementary outputs of the multivibrator 206. The output of AND gate 208 now switches to high voltage level at time $t_2$ in response to the trailing edge of the pulse 206b, and energizes the high frequency source 10. The trailing edge of the command signal at time $t_3$ raises the output 203a of inverter 203 to a high level, causing a pulse 205a to be applied from the diode 205 to the multivibrator 206, so that pulses 206c and 206d are generated. The pulse 206c is applied through OR gate 207 to continue the energization of solenoid 12 until time $t_4$, while the pulse 206d terminates the output 208a of AND gate 208 at time $t_3$.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A circuit arrangement responsive to a command signal for applying high frequency energy to the electrode of a capacitance detection stylus adapted for engaging slidably with a capacitance disc on which information is recorded as a geometric variation, comprising:
    first delay means responsive to the leading edge transition of said command signal for generating a first signal a delay time after the occurrence of said leading edge transition;
    second delay means responsive to the trailing edge transition of said command signal for generating a second signal a delay time after the occurrence of said trailing edge transition;
    stylus moving means responsive to said leading edge transition for moving said stylus to the surface of said disc to establish said slidable engagement and responsive to said second signal for moving said stylus away from said disc; and
    high frequency generating means responsive to said first signal for generating high frequency energy for application to the stylus electrode and responsive to said trailing edge transition for terminating said high frequency energy.

2. A circuit arrangement as claimed in claim 1, further comprising:
    first and second ganged switches each having operative and nonoperative contact positions, wherein said first delay means comprises:
    first time constant circuit means connected to a voltage source through said operative contact position; and
    first comparator means connected to the output of said first time constant circuit means for causing said stylus moving means to establish said slidable engagement when the output of said first time constant circuit is higher than a reference voltage and causing said stylus moving means to move away from said disc when the output of said first time constant circuit means is lower than said reference voltage, and wherein said second delay means comprises:
    second time constant circuit means connected to the output of said first comparator means; and
    second comparator means connected to the output of said second time constant circuit means through said operative contact position for causing said high frequency generating means to generate said high frequency energy when the output of said second time constant circuit means is higher than a reference value and causing said high frequency generating means to terminate said high frequency energy in response to said second switch being switched to the inoperative contact position.

3. A circuit arrangement as claimed in claim 1, wherein said first delay means comprises:
    first monostable means responsive to the trailing edge transition of said command signal for generating a first pulse; and
    first bistable means for causing said stylus moving means to establish said slidable engagement in response to the leading edge transition of said command signal and terminating said slidable engagement in response to the trailing edge transition of said first pulse, and wherein said second delay means comprises:
    second monostable means responsive to the leading edge transition of said command signal for generating a second pulse; and
    second bistable means for causing said high frequency generating means to generate said high frequency energy in response to the trailing edge of said second pulse and terminating said high frequency energy in response to the trailing edge transition of said command signal.

4. A circuit arrangement as claimed in claim 1, wherein said first and second delay means comprise:
    first edge detecting means for detecting the leading edge transition of said command signal;
    second edge detecting means for detecting the trailing edge transition of said command signal;
    a monostable multivibrator for generating a pair of complementary first and second outputs in response to each output of said first and second edge detecting means;
    an OR gate for combining said command signal and the first output of said multivibrator to apply an output signal to said stylus moving means; and
    an AND gate for combining said command signal and the second output of said multivibrator to apply an output signal to said high frequency generating means.

5. A method for operating a record stylus having an electrode adapted for generating a high frequency field in the dielectric layer of a capacitance disc record for detecting a geometric surface variation formed thereon, comprising:
    moving said stylus from an inoperative position to the surface of said record in response to the start of reproduction of said record;
    introducing a first delay time in response to the start of reproduction of said record;
    applying high frequency energy to said electrode at the termination of said first delay time;
    terminating said high frequency energy in response to the termination of the reproduction of said record;
    introducing a second delay time in response to the termination of said reproduction; and
    moving said stylus away from said record to said inoperative position in response to the termination of said second delay time.

* * * * *